INVENTOR.
EPHRAIM KONIGSBERG

United States Patent Office 3,427,885
Patented Feb. 18, 1969

3,427,885
DIFFERENTIAL PRESSURE TRANSDUCER
Ephraim Konigsberg, Sierra Madre, Calif., assignor, by mesne assignments, to Whittaker Corporation, Los Angeles, Calif.
Filed Dec. 23, 1966, Ser. No. 604,234
U.S. Cl. 73—398    10 Claims
Int. Cl. G01l 7/08, 9/04

ABSTRACT OF THE DISCLOSURE

A sensing element having a thin flexible diaphragm supported across a flexible tubular wall to define portions of two chambers on either side of the diaphragm. A spur, which forms an extension of the diaphragm externally to the tubular wall, is restrained from axial motion at its outer end. Pressure differentials between two chambers causes strain in the spur. The strain in the spur is proportional to the differential pressure across the diaphragm. This strain is measured by strain gauges.

Background of invention

In measuring the differential pressure between two media, flexing diaphragms have often been used where at least one of the media was not "wet" or liquid. Each side of the diaphragm was placed in communication with one of the media, causing the diaphragm to bend or flex away from the higher pressure medium. By measuring the amount of bending of the diaphragm, as by use of strain gauges mounted on one or both faces of the diaphragm itself, the differential pressure could be readily determined.

However, in a "wet-wet" application, i.e., where both media are liquid, mounting the strain gauges on a face of the diaphragm exposes the gauges to the liquid medium and tends to interfere with the proper functioning and durability of the transducer. Special mounting or housing of the strain gauges and their electrical leads to protect them, as for example by placing them within a cavity of a hollow diaphragm, have not proved satisfactory and have been complicated and costly.

Similarly, connecting the diaphragm and/or equivalent bellows to mechanical means whereby the motion of the diaphragm and/or bellows has been mechanically transmitted to a force sensing means external to the pressure reference cavity, and insulated therefrom by pressure seals, have been costly, and, because of the additional means employed to transmit energy from the pressure sensing diaphragm to the force sensing means, have inherently introduced friction and hysteresis.

In another prior art design, diaphragm deflection is used to move external posts around which wire is wrapped in initial tension. These posts may have sapphire bearings and a rather complicated structure and involve pre-tensioning of the wires, making such prior devices costly to produce and maintain.

Summary of invention

The present invention relates generally to determining differential pressure between two pressure media. It relates more particularly to a simplified construction and method for such determination in which a flexible diaphragm subjected to both pressure media is thereby flexed to cause bending and thus measurable strain at a surface of a bendable portion of the structure, which surface is separated from the pressure media. If further relates to a sensing structure or element for such a construction.

It is an object of the present invention to provide a novel and improved diaphragm-type differential pressure transducer and sensing structure therefor which utilizes diaphragm-induced bending or flexing in a portion of the structure other than the diaphragm.

It is another object to provide a novel and improved method for determining differential pressure.

Another object of the present invention is to provide high-sensitivity to pressure differential and low-sensitivity to line pressures in such apparatus and method.

Another object of the present invention is to provide such apparatus and method wherein the means for sensing the strain are isolated from the pressure media.

It is a further object of the present invention to provide such transduced and sensing structure which are compact, simple and economical to manufacture, install and service, and which are durable and dependable in operation.

Other objects and advantages of the present invention will become more apparent from the folowing description and the associated drawings.

Description of the preferred embodiments

Figure 1:
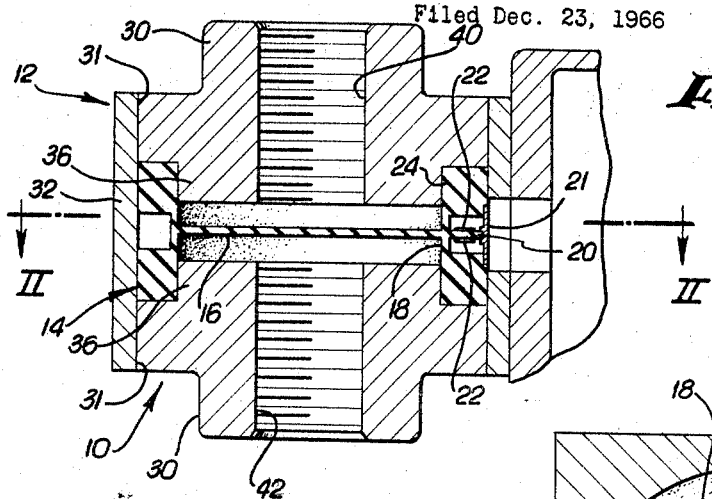
FIGURE 1 is a section view of an exemplary embodiment of a differential pressure transducer that includes a sensing structure, and incorporates various features of the present invention, also being operable in accordance with the method of the present invention.
Figure 2:
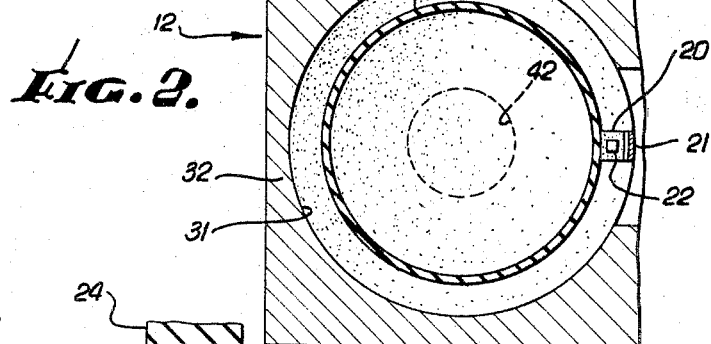
FIGURE 2 is a section view taken generally along the plane shown by line II—II of FIG. 1.

Briefly, the differential pressure transducer 10 shown in FIGS. 1 and 2 includes housing means 12 which supports a sensing structure or element 14 with the flexible diaphragm 16 of the element directly exposed at either side to media at pressure $P_1$ and $P_2$ respectively. The illustrated element 14 also includes a flexible tubular pressure-chamber-defining support wall 18 which is connected to and supports the diaphragm, and an external beam or spur 20 which forms an extension of the diaphragm outwardly of the wall 18. Restraining support means 21 restrain movement of the outer portion of the spur 20 axially of the tubular wall 18 so that slight flexing or bending of the diaphragm caused by a different in pressure between $P_1$ and $P_2$ imparts substantial bending to the spur 20. The bending and thus the strain in the spur 20 are proportional to the value of the pressure differential. Suitable strain sensing means including sensors such as strain gauges 22 may be mounted on the spur 20 to measure the differential pressure $(P_1-P_2)$. The transducer 10 is particularly adapted to "wet-wet" applications as the liquid pressure media are separated or isolated from the strain gauges 22. The strain gauges are readily accessible for installation, repair or replacement. Because a member (the spur 20) is bent or flexed rather than compressed or stressed in its plane, the amount of deformation produced by the force of a given differential pressure is amplified and a high-sensitivity to changes in differential pressure is achieved.

The illustrated sensing structure or element 14, as shown in FIGS. 1 and 2, may be constructed of any suitable selected flexible material such as titanium. Desirably, the sensing element is durable for withstanding repeated flexure of various amounts and durations. The element may be integrally formed or machined from a single piece of material or it may be fabricated as by brazing or welding from several parts or sections. For example, the diaphragm and spur may be comprised by one integral part which is secured to a support wall having an aperture through which the spur extends, or the diaphragm and spur may be separate parts suitably connected together so that flexing of the diaphragm will be transmitted to the spur. The illustrated element 14 includes a generally cylindrical thick outer wall 24 having its outer diameter reduced intermediate it ends to form the thin tubular or cylindrical flexible support wall 18. The diaphragm 16 extends transversely across and is connected to the support wall 18 generally midway between the ends of the wall. The spur or extension 20 extends radially outwardly in generally the plane of the diaphragm.

A restraining bar or strap which comprises the restraining means 21 is received in a suitable recess in the outer surface of the wall 24 outwardly of the spur 20 and is connected to the outer end of the spur to restrain or limit movement of that outer end axially of the tubular wall 18. The spur 20 is fixed to the strap so that radial movement of the spur is permitted only by the flexibility of the strap and/or the tubular wall 18.

The restraining strap 21 may either be made relatively rigid or partially flexible, thereby serving as additional means whereby the bending of the spur 20 can be predetermined. This provides an additional means whereby the differential pressure range of the sensing elements can be controlled without modifying the basic sensing element, thus leading to production economies by using relatively few configurations of the sensing element to cover a multiplicity of ranges. Various other suitable means could be provided for so restraining the movement of the end of the spur 20.

The housing means 12, which may take various suitable forms, supports the sensing structure or element 14 between two pressure media while the diaphragm 16, the portions of wall 18 adjacent the diaphragm, and the inner portion of the spur 20 are unrestrained against bending or flexing. A sealed pressure chamber is formed by the sensing element and the housing means at each side of the diaphragm. The illustrated housing means 12 includes a pair of generally cylindrical end supports or bells 30 mounted in a cylindrical bore 31 that extends through a housing or casing 32. The end supports 30 may be secured in place as by means of brazing. The end supports 30 support the sensing element 14 between them within the bore 31. The inner end of each end support 30 has a reduced diameter hub or means 36 which receives thereon one end of the sensing element. The sensing element may be secured adjacent its outer ends to the hubs 36 by means of brazing, which may also provide a seal between the element and the end supports 30. Each end support 30 has a central port 40, 42 therethrough and is adapted to be connected by suitable coupling means (not shown) in communication with one of the media at pressures $P_1$ and $P_2$ respectively. The inner end of each hub 36 is spaced from the adjacent diaphragm face so that the entire diaphragm 16 is unrestrained and free to flex; it is also exposed over its entire surface at both sides to the pressure media. The portions of the tubular wall 18 adjacent the diaphragm have clearance on both sides which permits them to bend or flex incident to the operation of the transducer. As noted above, the outer end or portion of the spur 20 may be restrained or limited in movement axially of the tubular wall by various suitable means; the inner portion of the spur 20 is not restrained or limited in such movement except by virtue of its connection to the wall 18 and to the outer spur portion.

Figure 3:
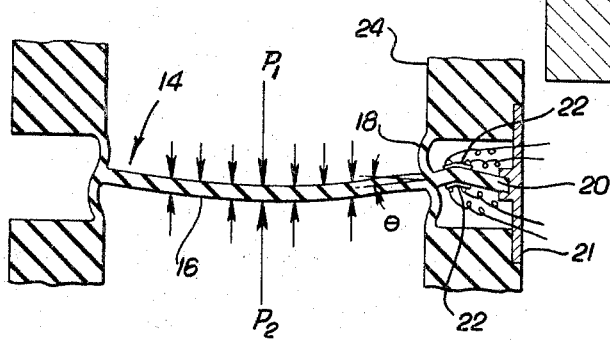
FIGURE 3 is a diagrammatic representation (exaggerated for purposes of illustration) of the sensing structure shown in FIGS. 1 and 2 subjected to a differential pressure $P_1-P_2$.

FIGURE 3 illustrates pictorially in exaggerated proportion the apparent bending of the various portions of the sensing structure or element when it is subjected to differential pressure $P_1-P_2$. In general, it appears that the diaphragm 16 bows slightly away from the higher pressure $P_1$, tending to move the outer edge of the diaphragm through a small angle $\theta$ from the non-deflected plane of the diaphragm (FIG. 1). The spur or extension 20 also tends to be moved through that angle $\theta$, however, because the outer end of the spur is restrained against movement axially of the tubular wall, the spur will tend to be bent or flexed generally as shown in FIG. 3. Since both the inner and outer ends of the spur are restrained against such axial movement, and since the diaphragm diameter is substantially greater than the spur length, a relatively small amount of diaphragm deflection will produce a relatively large amount of spur bending or flexing. The spur 20 is thus bent or flexed by the differential pressure on the diaphragm 16 to provide a high-sensitivity readily-measurable strain value which may be easily measured externally of the pressure chambers and is isolated from the pressure media. Since the spur is sealed from both pressure media, either or both media may be "wet" or liquid.

The portions or sections of the sensing structure or element may be selectively proportioned and arranged to achieve the desired flexing or bending of the spur or extension for the range of differential pressures to be measured or monitored. While the diaphragm is preferably proportioned so that when it is subjected to differential pressures in the selected range it will bend or flex enough to cause such desired bending of the spur, very little deflection of the diaphragm is required because of the high magnification in sensitivity noted above. Therefore, the diaphragm may be relatively quite thick, which provides protection against line over-pressure. This is a significant feature of the exemplary sensing structure in that it may combine high-sensitivity to differential pressure with such protection against high line pressures. The support wall thickness can be relatively quite thin without creating rupture problems, because of the axial shortness of that wall.

The bending of the spur referred to herein contemplates what may be termed a significant or substantial amount of deflection or distortion out of the non-deflected plane of the spur in view of the objective or purpose of such bending, i.e., to produce a measurable strain at the surface of the spur. Such a strain should be readily measurable by the nature or kind of strain gauge customarily or commonly used commercially to measure strain in similar devices; it would not be considered measurable or readily measurable as the terms are used herein simply because ultra-sensitive devices or instruments may be available which could measure such strain. To provide a commercially practical or feasible product, the strain must be capable of measurement by commercially available devices or gauges whose cost is generally compatible with the cost of such transducers. On the other hand, the flexing or bending contemplated would normally be quite small in relation to the dimensions of the spur, for example being substantially less than the thickness of the spur.

While the illustrated spur 20 provides an effective external means that measurably bends in response and in relation to the flexing of the diaphragm, other selected forms of bendable portions or means operatively related to the diaphragm to so respond may be utilized. For example, the thickness of the spur 20 may selectively vary from that of the diaphragm and two or more separate extensions or spurs may be selectively utilized. Also while the illustrated spur 20 lies in the non-deflected plane of the diaphragm and forms essentially an extension of the diaphragm, the spur or spurs may be selectively displaced axially of the wall from the diaphragm or may be inclined or angled from the plane of the diaphragm while maintaining the desired responsive bending in the spur incident to flexing of the diaphragm. The illustrated tubular support wall is generally cylindrical and normal to the diaphragm when the latter is not flexed, and the diaphragm is generally centered between the ends of the tubular wall. This generally symmetrical arrangement is desirable for minimizing line pressure effect and for ease and economy of manufacture, assembly and servicing; however, the support wall might be otherwise selectively configured as by being polygonal shaped, oppositely tapered frusto-conical or the like if desired for particular applications.

Various selected strain gauges may be used. For example, piezoresistive sensors or silicon semiconductor strain gauges, which provide high-sensitivity and high gauge factor (which permits operation at low strain levels), are desirable for use in the illustrated transducer.

The strain gauges 22 may be selectively positioned on the spur 20 to acieve high-sensitivity and good linearity over the range of differential pressures to be determined. Optimum locating will include a consideration of factors such as the configuration and characteristics of the sensing element, the line pressures and differential pressures involved and the configuration and characteristics of the strain gauges utilized.

It has been determined experimentally that for a configuration generally as shown in the drawings, the largest amount of bending and thus strain, occurs in the portion of the spur 20 adjacent the support wall 18. Excellent results have been achieved with a wall 0.01 in. thick and 0.0615 in. in length to each side of the diaphragm midline and a spur having a thickness of 0.023 in. and a radial total length of 0.18 in. Silicon semiconductor strain gauges, each with a sensitive length of 0.050 in., were placed on both the upper and lower surfaces of the spur with their midpoints one-fourth of the total spur length from the wall midline. The experimental sensing element had a Young's modulus of $15.5 \times 10^6$ p.s.i. and was subjected to pressure differentials of 10, 25 and 35 p.s.i.d.

The range over which the instrument operates may be varied by changing proportions and arrangement of the sensing element such as the diameter and thickness of the diaphragm, the thickness and length of the support wall, and the length of the spur or extension. This may also be controlled by changing the length, width, thickness, and rigidity of the restraining strap 21. Further, selection of materials to afford higher or lower modulus of elasticity in tension (Young's modulus) can be utilized to afford different ranges for identical dimensional configuration.

The output of the strain gauges 22 may be utilized to provide a visual reading or written record of the differential pressure ($P_1-P_2$) or it may be used to automatically monitor or control apparatus in response to changes in $P_1-P_2$. For example, the output of the strain gauges may be fed through a conventional balanced Wheatstone bridge circuit (not shown) which produces a signal output proportional to the differential pressure applied to the transducer. In the illustrated exemplary form of transducer, the gauges 22 are connected by suitable electrical wires to the electronics (not shown) of the strain sensing means which may be contained in an adjacent compartment of the casing.

Appropriate provision may be made for minor line pressure effect, and for temperature compensation.

Thus, the illustrated transducer 10 provides a simple and economical means for separating and thus protecting strain sensors from pressure media applied to a sensing structure or element responsive to differential pressure. The sensors are carried on a surface isolated from the pressure media but caused to bend in direct response to the differential pressure between the media. The bending provides a high-sensitivity response to changes in the differential pressure.

The illustrated sensing construction or element is simple, compact and durable, and it may readily and relatively inexpensively be fabricated from a single piece of material or from several sections. It also has inherent high resistance to zero shifts due to line pressure variation because the diaphragm is only slightly deflected, i.e., virtually plane, and thus inherently supports the wall 18 against line pressure. Further, the uniformity of the diaphragm need not be as carefully controlled as that of the customary pressure-responsive diaphragm directly carrying strain sensors, since the sensor output is a result of the integration of the pressure over the entire area of the diaphragm.

There are no extraneous parts between the strain sensors and the sensing element, which permits easy assembly, calibration and inspection of the sensors even after final assembly. The illustrated pressure chambers are simple and symmetrical, involving no linkages, push-pull rods, or closely matched convoluted diaphragms and backstops. The sensing element may be operated effectively at low stress levels to thereby provide both line and over-pressure protection without requiring mechanical backstops. In applications having high overload pressures, protection may be readily provided as by means of a simple over-pressure backstop positioned adjacent a diaphragm face because there are no convolutions in the diaphragm and because there are no mechanisms between the pressure ports and the diaphragm.

This freedom of the diaphragm from any linkage for transmitting force from the diaphragm surface, through a supporting wall, to an external sensing means, also permits symmetry of the differential pressure transducer which is important where the resonant frequency of the two pressure chambers must be matched.

The illustrated transducer 10 also provides a particularly simple, economical and effective support for the sensing element which affords easy assembly and support for the element and which does not interfere with or restrain the movement or bending of the portions of the element in response to changes in differential pressure.

The simplicity of the element contributes to its effective operation for long periods of time without requiring servicing or adjustment. The long-term stability of the transducer is aided by the construction of the device which tends to protect the sensing element from torque loads on the pressure fittings or mounting loads. This prevents long-term creep or stress relief associated with excess mounting or pressure fitting installation forces from affecting calibration stability. More particularly, the housing 32 can readily and separately be made sufficiently stiff so that the proportion of the torque load transmitted through the support wall 18 is negligible. In other words, while a torque load is transmitted through housing 32 and wall 18 in parallel, most of torque load is transmitted through housing 32, since it is radially further from the axial centerline of the transducer and thus has a longer moment arm. Further, the housing 32 can be made stiffer to thereby assume more of the torque load.

Figure 4:
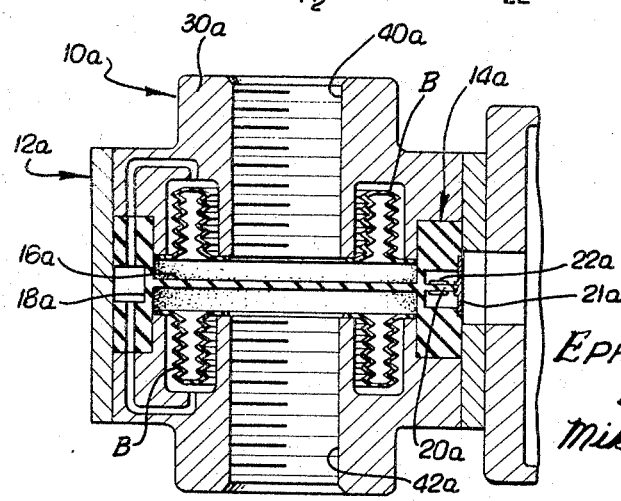
FIGURE 4 is a section view of a modified form of differential pressure transducer.

FIGURE 4 illustrates a modified form of transducer 10a which incorporates means for protecting against the effect of exceptionally high line pressure by equalizing the pressure across the tubular support wall at either side of the diaphragm. In the transducer 10a this has been achieved by the provision of a pair of annular bellows B. Each bellows B has its interior in communication with a pressure chamber at one side of the diaphragm 16a and its exterior in communication with the space radially outwardly of the support wall at that side of the diaphragm. The bellows B thus automatically extend or contract to equalize the pressure across them and to thus equalize the pressure across the tubular support wall while maintaining a seal around the pressure medium. Because bellows act to equalize pressures between the pressure $P_1$ and $P_2$ and the pressure on the outside of wall 18a, and not to transmit forces from $P_1-P_2$ to the sensing element, linearity, hysteresis, thermal effects, and non-repeatibility of the bellows are of relative non-consequence to the accuracy of the device.

The annular bellows is a particularly good configuration for such differential pressure devices since it is a compact arrangement which gives good volumetric change per unit force, i.e. a "limp" bellows in an extremely restricted space. Further, this is very good configuration for this particular transducer since it uses up space around ports otherwise not useful. A conventional bellows would have to be much larger to accomplish the same purpose, and would provide unsymmetric arrangements.

Various modifications and changes may be made in the illustrated structure without departing from the spirit and scope of the present invention.

Various features of the invention are set forth in the following claims.

I claim:

1. Pressure-responsive means comprising in combination:
   (a) a flexible diaphragm means;
   (b) wall means supporting said diaphragm means adjacent its periphery, and defining with said diaphragm means a portion of a pressure chamber at either side of said diaphragm means;
   (c) a bendable extension means including an outer portion extending outwardly from said wall means and generally aligned with said diaphragm means to form an extension of said diaphragm means;
   (d) restraining support means connected to the outer portion of said extension means for limiting the movement generally normal to said diaphragm means of said bendable extension means and with said bendable extension means constructed and arranged to cause a flexing of the diaphragm means and measurable bending of the extension means in accordance with the application of a pressure differential to said diaphragm means; and
   (e) measurement means carried on said bendable extension means and located intermediate said wall means and said restraining support means for producing a measurement of the bending of the extension means.

2. Pressure-respensive means as defined in claim 1, wherein said diaphragm means, said wall means and said extension means are integrally formed with one another.

3. Pressure-responsive means as defined in claim 1, wherein said wall means is generally tubular and is flexible.

4. Pressure-responsive means as defined in claim 2, wherein said wall means is generally symmetrical about its axis and said diaphragm means is generally normal to that wall means.

5. Pressure-responsive means as defined in claim 1, wherein the length of said bendable extension means is relatively small compared to the distance across said diaphragm means measured in line with said extension means.

6. Pressure-responsive means as defined in claim 1, in combination with means for restraining the outer portion of said extension against movement axially of the tubular wall means.

7. Pressure-responsive means as defined in claim 1, wherein the measurement means carried on said bendable extension means is strain-sensing means.

8. Pressure-responsive means as defined in claim 1, in combination with a housing means for supporting the diaphragm means, the portions of the wall means adjacent the diaphragm means, and the portion of the bendable extension means adjacent the diaphragm means unrestrained against limited movement.

9. A method of determining differential pressure between two media over a selected range of such pressures, comprising the steps of:
   (a) interposing a flexible member between the two pressure media, the member being such that it will be flexed by a differential pressure in the selected range;
   (b) supporting the member so that its flexing produces measurable bending at an outer surface of an outward extension of the member forming an associated bendable part which measurable bending is in proportion to the differential pressure, the outer surface being isolated from both the pressure media;
   (c) limiting movement of both ends of the part in a direction generally normal to the member; and
   (d) sensing the strain produced in the bent surface at an inward portion of the part.

10. Pressure-responsive means comprising, in combination:
    (a) a flexible diaphragm means;
    (b) wall means supporting said diaphragm means adjacent its periphery and defining with said diaphragm means a portion of a pressure chamber at either side of said diaphragm means;
    (c) a bendable extension means extending outwardly from said wall means and generally aligned with said diaphragm means to form an extension of said diaphragm means, the outer portion of said extension means being adapted to be limited in movement generally normal to said diaphragm means, said bendable extension means constructed and arranged so that subjecting said diaphragm means to a pressure differential across it in a selected range will cause flexing of the diaphragm means and measurable bending of the extension means in relation to the pressure differential; and
    (d) an annular pressure-equalizing bellows means in communication at one side with the region within a portion of the wall means at one side of said diaphragm means and in communication at the other side with the region outwardly of that portion of wall means, whereby protection is afforded against effects of exceptionally high line pressure.

References Cited

UNITED STATES PATENTS 2,840,675  6/1958  Di Giovanni _____ 338—4
3,269,187  8/1966  Perino _____ 73—398

LOUIS R. PRINCE, Primary Examiner.

D. E. CORR, Assistant Examiner.

U.S. Cl. X.R.
73—407